United States Patent [19]

Shimada et al.

[11] Patent Number: 4,505,994
[45] Date of Patent: Mar. 19, 1985

[54] METAL-HALOGEN SECONDARY BATTERY

[75] Inventors: Masayoshi Shimada; Hideki Komagata; Yasuhiro Iizuka, all of Ootsu, Japan

[73] Assignee: Toyo Boseki Kabushiki Kaisha, Osaka, Japan

[21] Appl. No.: 521,594

[22] Filed: Aug. 9, 1983

[30] Foreign Application Priority Data

Aug. 9, 1982 [JP] Japan ................................ 57-138699

[51] Int. Cl.³ ...................... H01M 4/96; H01M 10/36
[52] U.S. Cl. ..................................... 429/101; 429/209
[58] Field of Search ........................... 429/101, 40–42, 429/44, 209, 217, 199, 218, 105; 204/294

[56] References Cited

U.S. PATENT DOCUMENTS

| | | | |
|---|---|---|---|
| 4,113,924 | 9/1978 | Kantner | 429/101 X |
| 4,296,187 | 10/1981 | Barnes et al. | 429/209 X |
| 4,352,866 | 10/1982 | Klinedinst | 429/101 |
| 4,367,266 | 1/1983 | Kalnoki-Kis | 429/101 |
| 4,403,020 | 9/1983 | Dampier | 429/101 X |
| 4,443,522 | 4/1984 | Struthers | 429/101 X |

*Primary Examiner*—Anthony Skapars
*Attorney, Agent, or Firm*—Armstrong, Nikaido, Marmelstein & Kubovcik

[57] ABSTRACT

In a metal-halogen secondary battery a sheet-shaped article containing porous carbon fibers is joined to the surface of the positive electrode.

10 Claims, No Drawings

METAL-HALOGEN SECONDARY BATTERY

BACKGROUND OF THE INVENTION

1. Field of the Invention

The present invention relates to a metal-halogen battery, and more particularly it relates to a secondary battery in which zinc is the active material of the negative electrode and bromine is the active material of the positive electrode and in which a particular porous carbon fiber sheet-shaped article is applied onto the positive electrode surface.

2. Description of the Prior Art

Since the energy crisis in 1973, the importance of the energy problem has become widely acknowledged in various fields. While it has become important to develop new energy sources, it has also become important to develop systems which utilize the generated energy effectively, including those for the conversion, storage, transportation, utilization, etc. of energy. Taking the storage as an example, in the large scale generation of electricity such as atomic power generation, coal thermal power generation, etc. which are expected to constitute a large percentage of the electric energy sources in the future, it is necessary for maintaining a high efficiency to generate electricity with a constant output. Therefore a strong requirement for developing a technique of electric energy storage which makes it possible to suitably store the surplus electric energy during the night and release it during daytime in accordance with the variations of energy demand. For example, at present, the yearly working ratio of the main electric power plants is less than 60% in Japan, and there is a continuing decline. Although as a method of storage of electric energy pumping-up hydraulic power generation has been put into practical use, it involves a loss of energy due to transmission, and is becoming limited in the location. Therefore, various other methods, such as new type secondary battery, fly wheel, compressed air, super conduction, etc. are being studied.

Among others, the electrochemical operations using new type battery systems are promising, and these are thought to be the method most realizable for some time to come which replaces the pumping-up hydraulic power generation. And these systems will solve the problems of location and transmission. Also, the new type secondary battery is expected as a backup apparatus for the electric power generation utilizing natural energies such as solar light, wind power, wave power, etc., and it is also expected as the battery for use in electric automobiles. As the secondary battery applicable for the above-mentioned purposes, there have been developed lead storage battery, sodium-sulfur battery, lithium-iron sulfide battery, metal-halogen battery, redox flow type battery, etc. Among these batteries, metal-halogen battery (for example, zinc-chlorine, or zinc-bromine secondary battery) is being developed rapidly in recent years, because of its excellent characteristics such that the battery output is easily regulatable since it is of liquid circulation type; its maintenance control is easy since it is an aqueous solution type battery which operates at low temperatures; the battery capacity can be easily regulated by the electrolyte reserver volume; the active materials of both electrodes are abundant in natural resources and are low-priced; its theoretical energy density is high; and since the battery reaction is simple, the battery is simple in structure and can be made with cheap materials. For example, in the zinc-bromine secondary battery, the active material at the negative electrode; is zinc and the active material at the positive electrode is bromine, and an aqueous $ZnBr_2$ solution is used as the electrolyte. The electric charge and discharge reactions proceed as follows:

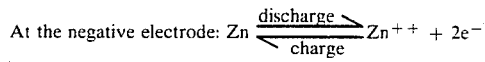

At the negative electrode: $Zn \underset{charge}{\overset{discharge}{\rightleftarrows}} Zn^{++} + 2e^-$

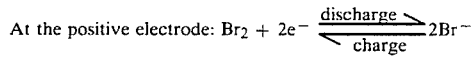

At the positive electrode: $Br_2 + 2e^- \underset{charge}{\overset{discharge}{\rightleftarrows}} 2Br^-$ However, in order to put the metal-halogen battery into practical use, there are several problems to be solved. Among others, it is the most important technical subject how rapidly and effectively the reduction reaction of halogen at the positive electrode should be caused, because it influences directly to the energy efficiency of the battery. Examples of inexpensive positive electrodes replacing the conventional Pt plate include a carbon-plastic electrode in sheet-form produced by the heat-press shaping of a mixture of an electroconductive carbon powder and a resin powder, and a sintered carbon plate. With these electrodes, when the discharge proceeds and the concentration of the active material (halogen) at the positive electrode is lowered, it has been usual that the potential drop is remarkable and the energy efficiency of the battery remains at a low value. Especially, upon the electric discharge at a high current density, a marked potential drop has been observed.

STATEMENT OF THE INVENTION

We conducted research to find a remedy for the various disadvantages attendant upon the conventional carbon-plastic electrodes and sintered carbon plates, and as a result we have reached the present invention.

The present invention is a metal-halogen secondary battery in which is used positive electrode produced so that, on the surface of the electrode substrate a material (electricity collector) such as the above-mentioned carbon-plastic electrode plate or sintered carbon plate, is joined a sheet-shaped article containing porous carbon fibers, of which the pore volume of the pores having a diameter in the range of from 30 to 100 Å is more than 0.1 cc/g.

The reason why the reduction reaction of halogen does not proceed sufficiently on the conventional carbon-plastic or sintered carbon plate electrode, is supposed to be that, since the electrode surface is smooth and the real reaction surface area is small, when the halogen concentration lowers, the amounts of diffusion and adsorption of halogen to the electrode surface decrease, that is to say, the so-called polarization is caused. Then we tried etching of the surface of the carbon-plastic electrode by various methods to increase the surface area, or we made by way of trial an electrode in which activated carbon powder was used in place of carbon powder. But the effect was not satisfactory enough. Thereupon, we made an electrode such that a sheet-shaped article composed of porous carbon fibers is bonded to the surface of the positive electrode substrate material composed, for example, of the above-mentioned carbon-plastic plate or sintered carbon plate. When this electrode was used in the metal-halogen secondary battery, the positive electrode potential was very high even when the halogen concentration was lowered, and also the energy efficiency of the battery was markedly improved. When using a sheet-shaped article composed of porous carbon fibers, of which the pore volume of the pores having a diameter from 30 to 1000 Å is more than 0.1 cc/g-carbon fiber, it has been found that an excellent value is obtained for both valtaic and coulombic efficiency, and an electrode performance not inferior to that of precious platinum plate was exhibited. If the distribution of the pores is composed mainly of a diameter less than 30 Å, the diffusion coefficient in the pores of the halogen dissolved in the electrolyte is small because of the small pore diameter and these pores do not act effectively on the electrode reaction. On the contrary, if the distribution of pore diameters exceeding 1000 Å is predominant, the whole surface area of the porous carbon fibers becomes small and therefore such a pore diameter is not desirable. Futhermore, in the case of a sheet-shaped articles composed of porous carbon fibers, of which the pore volume composed of the pores having a diameter within the range of 30 to 1000 Å is less than 0.1 cc/g, the surface area per unit volume becomes small and the effect of the present invention cannot be obtained. Also, the fiber density of the sheet-shaped article is preferably more than 0.1 gg/cc. A fiber density less than 0.1 g/cc makes the contact between the fibers insufficient, increases the electric resistance, induces an increases of the internal resistance of the battery and lowers the voltaic efficiency. Therefore such a fiber density is not favorable. Furthermore, when the fiber density is less than 0.1 g/cc, upon producing the electrode, falling-off of the fibers is liable to occur and there may be a problem in respect of processing.

DESCRIPTION OF PREFERRED EMBODIMENT

The raw material fibers used in the present invention may be any that can be carbonized. However, cellulosic, acrylic, phenolic fibers or fibers from petroleum or coal pitch can be advantageously used because of their ease of carbonization, ease of causing the porosity to develop, strength and elongatation of the porous carbon fibers, etc.

For the sheet-shaped articles employed in the present invention, woven fabrics, knit fabrics, paper-like articles, etc. containing at least 30 weight % of porous carbon fibers are advantageously used.

The term "woven fabric composed of porous carbon fibers" means a cloth-shaped article interwoven lengthwise and breadthwise with porous carbon fiber yarns composed of a plurality of single porous carbon fiber. For example, by using as the starting material a cloth produced by interweaving lengthwise and breadthwise spun yarns or filament yarns composed of carbonizable organic material, and by carbonizing it and developing its porosity (i.e. activation), it is possible to produce a woven fabric composed of porous carbon fibers; or it can be also produced by weaving into a cloth the yarns after carbonization or after activation. The construction of weaving may be any that are usually used. For example, it can be selected from plain weave, twill weave, crape weave or satin weave.

The term "knit fabric composed of porous carbon fibers" means a porous carbon fiber cloth obtained by preparing a tubular knit fabric or a warp knit fabric (having for example a construction of double denbigh, double cord, half tricot, half back, interlock, jacquard stitch, mock loading, rib, etc.) from a spun yarn or a filament yarn composed of a carbonizable organic material, and carbonizing and activating it to produce the porous carbon fiber fabric which retains the initial geometrical construction.

The paper-like articles composed of porous carbon fibers can be produced from porous carbon fibers by the following method: porous carbon fibers are mixed with other organic or inorganic fibers, if necessary with a binder, and the mixture is made into a paper-like article. This paper-like article may be further carbonized or activated. In the present invention, non-woven fabrics may be used, but in this case it is desirable to employ those having a relatively high fiber density (for example, higher than 0.10 g/cc).

For the carbonization of the above mentioned organic fibers or sheet-shaped articles, a suitable method should be selected depending on the characteristics of the organic substance which composes respective fibers. For the activation of the fibers, any method may be employed which can make the fibers finally have a pore volume more than 0.1 cc/g of the pores of 30–1000 Å diameter. The sheet-shaped articles of porous carbon fibers may be obtained by carbonizing yarns, cloths of paper-like articles composed of single porous carbon fibers. The activating method at a temperature between 400° C. and 1100° C. in an atmosphere of steam, carbon dioxide or oxygen for obtaining activated carbonaceous fibers is effective as a simplest method. Especially advantageously used for this purpose is a method wherein carbonaceous fibers, of which the volume of pores of 30–300 Å diameter is less than 0.1 cc/g, are caused to carry at least one compound selected from compounds of II A Group elements of the Periodic Table and transition metals, and then the fibers are subjected to reactivation treatment to bring the volume of pores of 30–1000 Å diameter to more than 0.1 cc/g.

To reduce the internal resistance of the battery and to increase the oxidation-reduction reaction speed of halogen at the positive electrode by bringing the specific electric resistance of the porous carbon fibers to less than $5 \times 10^{-2} \Omega.cm$, the carbon fibers may be subjected to the activation after a high temperature treatment between 1100° C. and 3000° C. in an inert gas, or conversely the suitable high temperature treatment may be carried out after the activation.

To produce a positive electrode by using the sheet-shaped article containing porous carbon fibers thus produced, the sheet-shaped article is joined or bonded to the surface of the electrode substrate material: The sheet-shaped article is placed on the bottom of a metallic mold, and a uniform mixture of an electroconductive carbon powder and a resin powder (for example an olefin resin powder) is added in an even thickness, the temperature of the metallic mold being set so that it is by 10° C. higher than the softening point of the resin. The mixture is then heat-pressed to produce a positive electrode which is composed of a carbon-plastic plate, on which surface is joined the sheet-shaped article of porous carbon fibers. Alternatively, the same positive electrode can be produced by first placing a mixture of an electroconductive carbon powder and a resin powder in an even thickness on the bottom of a metallic mold, of which the temperature is set by 10° C. higher than the softening point of the resin, heat-pressing the mixture to prepare a carbon-plastic plate beforehand, then placing the sheet-shaped article on the carbon-plastic plate, and heat-pressing the whole body.

As for the pore diameter and the pore volume of the porous carbon fibers in the present invention, the pore volume of the pores in the range of 30 to 300 Å diameter was obtained after the calculating method by Cranston-Inkley using the nitrogen gas adsorption isothermal line on the adsorption side at the boiling point of liquid nitrogen under atmospheric pressure; the pore volume of the pores in the range of 300 to 1000 Å diameter was determined by the measurement with a mercury porosimeter; and the transitional pore volume of the pores having a diameter from 30 to 1000 Å (hereinafter abbreviated as $TPV_{30}{}^{1000}$) was obtained by the sum of the above-mentioned two pore volumes. As for the relation between the thickness (t) of nitrogen multilayer at adsorption and the relative pressure (P/Ps), the formula of Frenkel-Halsey:

$$t(Å) = 3.54[5/\ln(Ps/P)]^{\frac{1}{3}}$$

was employed.

In the following, the present invention will be explained in further detail by way of Examples, but it is to be understood that the invention is not limited to these Examples.

COMPARATIVE EXAMPLE 1

A polyolefin resin powder and an electroconductive carbon powder were uniformly mixed so that the latter constituted 30 weight %. The mixture was placed in an even thickness on the bottom of a metallic mold, of which the temperature was set by 10° C. higher than the softening point of the resin, and then the mixture was heat-pressed to produce a carbon-plastic plate of a 10 cm square with a thickness of 1.0 mm. This plate was placed as the positive electrode in one compartment of a flow-type electrolytic cell, of which the separator was a cation-exchanges membrane. In the other compartment, a rolled zinc plate of a purity of 99.99% was placed as the negative electrode. Though this negative compartment, a constant quantity of a negative aqueous electrolyte containing zinc bromide, 3.0 mol/l in concentration, and potassium chloride, 4.0 mol/l in concentration, was circulated. In the positive compartment, a positive electrolyte solution containing zinc bromide and potassium chloride, both in the same concentration as in the negative electrolyte, and additionally containing 3.0 mol/l bromine, was circulated. Then, at a current density of 40 mA/cm² discharge test was carried out at room temperature. The single electrode potential of the positive electrode was observed with a silver-silver chloride reference electrode having a Luggin capillary. And also the bromine concentration in the positive electrolyte was observed. The results are shown in Table 1. The results when using a platinum plate as the positive electrode are also shown in Table 1.

TABLE 1

| Positive electrode | Positive electrode potential (V) | |
| --- | --- | --- |
| | $Br_2$ 2.0–3.0 M/l | $Br_2$ 0.4–0.8 M/l |
| Carbon-plastic (comparative example 1) | 0.512 | 0.121 |
| Platinum (reference example) | 0.792 | 0.731 |

The value at bromine concentration 2.0–3.0 M/l corresponds to the initial and middle stage of discharge, and the value at 0.4–0.8 M/l corresponds to the last stage of discharge. It is seen that in the carbon-plastic electrode there is a large potential drop at the last stage of discharge.

EXAMPLES 1–4 AND COMPARATIVE EXAMPLES 2–3

We prepared several kinds of twill fabrics having different weights per area, using spun yarns of different yarn count numbers, composed of 2.0 d regenerated cellulosic fibers. Also, using spun yarns of different yarn count numbers, composed of 2.0 d regenerated cellulosic fibers, we prepared several kinds of interlock stitch knit fabrics having different weights per area. These woven or knit fabrics were immersed in an aqueous solution of ammonium secondary phosphate, then squeezed and dried so that the fabrics would contain 10% of ammonium secondary phosphate based on the fiber weight. Thereafter, the fabrics were heated in an inert gas current at 270° C. for 30 minutes, and subsequently heated from 270° C. to 850° C., spending about 90 minutes. The fabrics were further treated for 30 minutes in a gas current which contained 40% by volume of steam, to produce porous carbon fiber woven fabrics (A) and knit fabrics (M) each having a weight per area of 45–50 g/m². The fabrics subjected to activation treatment in steam for 60 minutes and given the same order of weight per area as (A) and (M) were named (B) and (N) respectively for woven and knit fabrics. Further, the starting material fabrics, from which (B) and (N) were obtained, were subjected to the same treatment as that gave (A) and (M). The thus-obtained porous carbon fiber fabrics were immersed in an aqueous solution of ferric chloride so that the fabrics would contain ferric chloride corresponding to 4.3 and 4.7 weight % Fe, respectively. After drying, the fabrics were heated from 100° C. to 850° C. in a nitrogen gas current containing 40 volume % of steam. After being maintained in this condition for 15 minutes, the fabrics were cooled in an inert gas. After being washed with a 1N HCl solution, the fabrics were rinsed with water and dried. The thus-obtained porous carbon fiber woven fabrics and knit fabrics, each having a weight per area of 45–50 g/m², were named (C) and (P), respectively. The various porous carbon fiber fabrics thus obtained were each placed on the bottom of the metallic mold mentioned in Comparative Example 1, and the carbon-plastic powder mixture used in Comparative Example 1 was placed in an even thickness on the fabric, and heat-pressed to produce an electrode (positive pole) of a carbon-plastic plate, 10 cm square, 1 mm in thickness, on which surface the porous carbon fiber fabric was joined.

Discharge experiments of the zinc-bromine battery which used the electrode of the present invention as the positive pole were carried out in the same way as in Comparative Example 1, and the results shown in Table 2 were obtained.

It is understood from Table 2 that, when the positive electrode of the present invention was used, not only in the early stage of discharge ($Br_2$ 2.0–3.0 Mol/l concentration) but also in the last stage of discharge ($Br_2$ 0.4–0.8 Mol/l concentration), there was only small drop in the positive potential and the energy efficiency was maintained stably.

TABLE 2

| Name of fabric joined to the positive electrode | TPV$_{30}^{1000}$ (cc/g) | Fiber density (g/cc) | Positive electrode potential (V) | | Remarks |
|---|---|---|---|---|---|
| | | | Br$_2$ 2.0–3.0 M/l | Br$_2$ 0.4–0.8 M/l | |
| A | 0.04 | 0.235 | 0.632 | 0.450 | Comp. Ex. 2 |
| B | 0.10 | 0.171 | 0.785 | 0.715 | Ex. 1 |
| C | 0.35 | 0.181 | 0.806 | 0.731 | Ex. 2 |
| M | 0.05 | 0.205 | 0.695 | 0.545 | Comp. Ex. 3 |
| N | 0.11 | 0.176 | 0.737 | 0.630 | Ex. 3 |
| P | 0.41 | 0.165 | 0.781 | 0.676 | Ex. 4 |

Weight per area of fabric: 45–50 g/m$^2$

EXAMPLES 5–6 AND COMPARATIVE EXAMPLE 4

Regenerated cellulosic cut fibers (mono-filament denier: 2μ, length: 3 mm) were immersed into an aqueous ammonium secondary phosphate, centrifuged and dried so that the ammonium salt would be contained in the fibers in an amount of 9.5 weight % based on the fiber weight. The fibers were then heated in an inert gas current at 270° C. for 30 minutes, and subsequently heated from 270° C. to 850° C., spending about 90 minutes. The fibers were further treated in a nitrogen gas current containing 40 volume % steam, for 30 minutes or 60 minutes to obtain porous carbon fibers A and B, respectively. A part of porous carbon fiber A were immersed in an aqueous solution of magnesium acetate so that fiber A would contain 2.1 weight % magnesium acetate so that fiber A would contain 2.1 weight % magnesium acetate based on the fiber weight. Thereafter, fiber A was dried at 90° C. and heated from 100° C. to 850° C. in a nitrogen gas current containing 40 volume % steam. After being maintained in this condition for 25 minutes, fiber A was cooled in an inert gas current, washed with a 0.1N HCl solution, rinsed with water and dried to obtain porous carbon fiber C. 70 weight % respectively of fibers A, B and C thus obtained, 30 weight % of polypropylene single fibers, and small quantities of a viscosity increasing agent and a binder were mixed to prepare a paper-making solution. After paper making and drying, the mixture was heat-pressed to obtain papers AP, BP and CP (of which the weight per area was 50 g/m$^2$) containing fibers A, B and C, respectively.

The three kinds of porous carbon fiber papers were placed on the bottom of the metallic mold used in Comparative Example 1, and on this the carbon-plastic powder mixture used in Comparative Example 1 was placed in an even thickness. The whole body was heat-pressed to obtain a compound electrode (positive electrode) composed of a carbon-plastic plate (10 mm square, 1 mm thick), on which surface the porous carbon fiber paper was joined.

Discharge experiment of the zinc-bromine battery in which the electrode of the present invention was used as the positive electrode, was carried out in the same manner as in Comparative Example 1, and the results in Table 3 were obtained.

TABLE 3

| Paper joined to the positive electrode | TPV$_{30}^{1000}$ of porous carbon fiber (cc/g) | Porous carbon fiber density in the paper (g/cc) | Positive electrode potential (V) | | Remarks |
|---|---|---|---|---|---|
| | | | Br$_2$ 2.0–3.0 M/l | Br$_2$ 0.4–0.8 M/l | |
| AP | 0.04 | 0.22 | 0.60 | 0.43 | Comp. Ex. 4 |
| BP | 0.10 | 0.21 | 0.75 | 0.69 | Comp. Ex. 5 |
| CP | 0.35 | 0.18 | 0.79 | 0.72 | Comp. Ex. 6 |

It is understood from Table 3 that, when the positive electrode of the present invention was used, not only in the early stage of discharge (Br$_2$ 2.0–3.0 Mol/l concentration) but also in the last stage of discharge (Br$_2$ 0.4–0.8 Mol/l concentration), there was small potential drop in the positive electrode and the energy efficiency was stably maintained.

What is claimed is:

1. A metal-halogen secondary battery characterized by using a positive electrode produced so that, on the surface of the substantial material of the electrode, is joined a sheet-shaped article containing porous carbon fibers, of which the pore volume of the pores having a diameter in the range of from 30 to 1000 Å is more than 0.1 cc/g.

2. The secondary battery as claimed in claim 1 wherein the sheet-shaped article has a fiber density more than 0.1 g/cc.

3. The secondary battery as claimed in claim 1 wherein the sheet-shaped article is a woven fabric.

4. The secondary battery as claimed in claim 1 wherein the sheet-shaped article is a knit fabric.

5. The secondary battery as claimed in claim 1 wherein the sheet-shaped article is a paper-like article.

6. The secondary battery as claimed in claim 1 wherein the porous carbon fibers have an electric specific resistance lower than $5 \times 10^{-2}$ Ω.cm.

7. The secondary battery as claimed in claim 1 wherein the substrate material of the electrode is a sheet produced by heat-press shaping of a mixture of a carbon powder and a resin powder.

8. The secondary battery as claimed in claim 1 wherein the sheet-shaped article and the substrate material of the electrode are joined together by heat-pressing.

9. The secondary battery as claimed in claim 1 in which zinc is the active material of the negative electrode.

10. The secondary battery as claimed in claim 1 in which bromine is the active material of the positive electrode.

* * * * *